(12) United States Patent
Martinez

(10) Patent No.: US 6,562,275 B1
(45) Date of Patent: May 13, 2003

(54) MOLD AND METHOD FOR SEQUENTIALLY INJECTING PLASTICS MATERIAL TO FORM AN AUTOMOTIVE VEHICLE BODY PART

(75) Inventor: Bernard Martinez, Murieux-Volognat (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 09/601,454

(22) PCT Filed: Feb. 26, 1999

(86) PCT No.: PCT/FR99/00440

§ 371 (c)(1),
(2), (4) Date: Oct. 11, 2000

(87) PCT Pub. No.: WO99/43484

PCT Pub. Date: Sep. 2, 1999

(30) Foreign Application Priority Data

Feb. 26, 1998 (FR) ............................................. 98 02360

(51) Int. Cl.[7] ............................................. B29C 45/28
(52) U.S. Cl. ..................... 264/308; 425/573; 425/562; 264/328.8
(58) Field of Search ............................. 264/308, 328.8; 425/572, 588, 573, 562

(56) References Cited

U.S. PATENT DOCUMENTS 4,787,841 A * 11/1988 Simon ......................... 425/556
4,980,111 A * 12/1990 Majerus ..................... 264/219
5,389,714 A * 2/1995 Ohtomo et al. ............. 524/497
5,478,230 A * 12/1995 McGrevy ..................... 425/564
5,919,492 A * 7/1999 Tarr et al. ................ 264/328.8
6,140,716 A * 10/2000 Norton ........................ 307/125

FOREIGN PATENT DOCUMENTS

| EP | 0 043 174 A2 | 1/1982 |
| EP | 0 623 8704 | 8/1994 |
| EP | 0 623 8706 | 8/1994 |
| EP | 0 630 731 A1 | 12/1994 |
| EP | 0 900 1690 | 1/1997 |
| FR | 2.054.560 | 5/1970 |
| GB | 2 136 364 A | 9/1984 |
| JP | A-7-14 4340 | 6/1995 |

OTHER PUBLICATIONS

*Sequential Solutions*, European Plastics News, No. 9, Oct. 21, 1994, pp. 29.

* cited by examiner

Primary Examiner—Jill L. Heitbrink
Assistant Examiner—Monica A Fontaine
(74) Attorney, Agent, or Firm—Oliff & Berridge, PLC

(57) ABSTRACT

The invention relates to a method of producing an automotive vehicle body part (1) by injecting a plastics material sequentially into a mold fed by one or more cold runners, the method consisting in filling firstly a first region (A) at one end of the mold, then a second region (B) adjacent to the first region, and repeating the operation consisting in filling a new region adjacent to the preceding region each time, until a last region (C) of the mold is reached at its end opposite from the first region (A). Each cold runner is shut off using a cold rod which is axially movable in a bore intersecting the cold runner, the longitudinal section of the rod overlaying the cross section of the runner.

13 Claims, 5 Drawing Sheets

FIG_4

MOLD AND METHOD FOR SEQUENTIALLY INJECTING PLASTICS MATERIAL TO FORM AN AUTOMOTIVE VEHICLE BODY PART

The present invention relates to a method of producing an automotive vehicle body part by injecting a plastics material, to a method of injecting a plastics material sequentially, to a mold for carrying out said methods, and to the plastics material parts obtained.

The fenders and external door panels of automotive vehicles constitute parts which are particularly difficult to produce from plastics material since their surface must be very good, their mechanical properties must be good and they have to resist the cataphoresis treatment which has to be carried out on the metal bodywork and structural parts of a vehicle.

Further, because they are thin, i.e., about 2 to 3 millimeters (mm) thick, while their surface area is of square meter ($m^2$) order, the geometry of such parts does not lend itself well to injection molding, meaning that the injection conditions have to be carefully controlled unless surface defects, mainly due to irregular flow of the plastics material in the mold, can be tolerated.

The document "SEQUENTIAL SOLUTIONS" (H. Guyot), published in EUROPEAN PLASTICS NEWS, vol. 21, N° 9, October 1994, page 29, demonstrates that it is known to improve the surface quality of such parts using sequential injection of the material to fill the cavity of the mold in successive passes.

However, that sequential injection method is suitable only for thermoplastic materials with a relatively low melting point, such as polypropylene, since the shut-off nozzles used can operate only within a limited temperature range.

In order to obtain particular mechanical properties, certain body parts, in particular fenders, are produced from an alloy of polyamide and a polyphenylene-ether which is a material which is injected at very high temperature, preferably 310° C.

Such an injection temperature is incompatible with sequential injection carried out using the shut-off nozzles that are currently available.

There is thus a need to provide a method of injecting a plastics material sequentially at very high temperature.

SUMMARY OF THE INVENTION

The present invention aims to provide novel methods which can overcome those disadvantages.

In a first aspect, the present invention provides a method of producing an automotive vehicle body part by injecting a plastics material sequentially into a mold fed by one or more cold runners, the method consisting in filling firstly a first region at one end of the mold, then a second region adjacent to the first region, and repeating the operation consisting in filling a new region adjacent to the preceding region each time, until a last region of the mold is reached at its end opposite from the first region, the method being characterized in that each cold runner is shut off using a cold rod which is axially movable in a bore intersecting the cold runner, the longitudinal section of the rod overlaying the cross section of the runner.

Within the context of the invention, the term "cold runner" and "cold rod" mean an unheated runner and rod, which are therefore at the temperature of the mold at the moment of injection.

The method of the invention is particularly applicable to sequential injection of an alloy of a polyamide and a polyphenylene-ether, even though this material is very sensitive to temperature variations and solidifies very rapidly just after being injected, to such an extent that if this alloy is injected into a mold via cold runners, i.e., supply runners which are not preheated at the moment of injection, a molten alloy sheath forms inside the runner, which sheath has viscosity higher than that of the remainder of the molten alloy and therefore penetrates into the mold cavity at a slower rate than the remainder of the molten alloy, producing surface defects which can result in rejection of the part if it does not satisfy minimum surface quality conditions.

The inventors of the present invention have demonstrated that contrary to expectations, the surface defects observed, in particular when injecting at a plurality of points through cold runners, disappear if the mold is filled by commencing at one end thereof and progressing towards its opposite end.

The present invention is of particular application when a plastics material is injected at high temperature, for example the alloy of polyamide and polyphenylene-ether cited above, where injection is carried out above 290° C., preferably 310° C.

In a preferred embodiment of the invention, the plastics material used is an alloy of the type which has to be injected at more than 290° C., in particular an alloy of a polyamide and a polyphenylene-ether, such as the alloy sold by GENERAL ELECTRIC PLASTICS B.V. under the trade name NORYL GTX.

In order to inject the plastics material by filling contiguous regions of the mold starting from one end thereof, in one particular implementation of the invention, a mold can be used that comprises a plurality of cold runners to direct the plastics material into the mold cavity, these cold runners being shut off at the start of injection and then sequentially opened to inject plastics material into each successive region of the mold.

In this respect, the present invention has the advantage that the shut-offs used are not bulky and can be juxtaposed and be very close to one another, meaning that molds can be produced with tightly grouped sprue trees, something which was impossible with the heated shut-off nozzles used until now because of their bulk.

In a particular variation of this implementation, after one cold runner has been opened, it is individually shut off again before the next cold runner is opened, and then all the cold runners are opened to compact the plastics material and keep it under pressure as it cools.

Sequential injection is thus carried out at a plurality of points.

Given that the cavity feed runners are cold runners, causing the molten plastics material to stand still would be expected to make it tend to solidify in the runners, but tests carried out by the inventors have shown that it is possible for each runner to be opened, shut off and opened again without producing a defect in the part obtained.

In a preferred variation, the rod used as a shut-off also acts as an ejector to unmold the plastics material sprue tree originating from the cold runners during molding of the plastics material part.

The present invention also provides a method of injecting plastics material sequentially into a mold fed by cold runners, to produce an automotive vehicle body part, the method being characterized in that it consists in providing the mold with bores intersecting the cold runners and with axially movable cold rods in said bores, the longitudinal section of each rod overlaying the cross section of the corresponding runner, in shutting off the cold runners using the rods at the start of injection, and in opening them individually by displacing the rods in the bores.

This method has the advantage of being capable of being carried out in simple manner, avoiding the need for shut-off nozzles.

Further, the method of the invention enables sequential injection to be carried out in molds having cavities that do not permit shut-off nozzles to be housed.

An example of an application of sequential injection which can be mentioned is the above-described method consisting in filling the mold, starting from one of its ends and going towards its opposite end, but clearly the sequential injection method of the invention is not limited to this application.

The invention also provides an injection mold for carrying out the above-described methods, the mold being characterized in that it comprises, as a shut-off for a cold runner, a rod with a longitudinal section which overlays the cross section of the cold runner, the rod being axially movable in a bore intersecting the cold runner between a shut off position in which it traverses the cold runner and an open position in which it is retracted from the cold runner and leaves the cross section of the cold runner open.

Such a mold has the advantage of being particularly economical to manufacture and maintain.

From the manufacturing viewpoint, the use of simple cold rods to shut off the cold runners reduces the cost of the mold by a factor of five or seven. Regarding maintenance, the absence of a heating block in the mold eliminates cooling time and heating time which generally prolong downtime.

In a preferred variation, the rod also acts as an ejector for unmolding the plastics material sprue tree originating from the cold runners on unmolding the plastics material part.

This variation provides a mold which is very adaptable in use since this mold can also be used to carry out the invention, i.e., shutting off the cold runners by the ejectors then ejecting the part obtained, and also to carry out molding without shutting off the cold runners, the ejectors then acting solely to eject the part obtained.

In a particular embodiment, the rod is mounted on an independent actuator which allows it to be displaced in the bore and to shut off the cold runner while the mold is closed.

In other words, this actuator enables to rod to carry out both of the shut-off and ejection functions, the shut-off function being accomplished when the mold is closed and the independent actuator urges the rod into the bore to intersect the cold runner, while the ejection function is accomplished following injection, after the rod has been returned to the normal position by the independent actuator, when the rod acts while unmolding the complete part to eject the sprue tree that results from the cold runners being filled.

The present invention also provides plastics material parts obtained by carrying out the methods described above.

BRIEF DESCRIPTION OF THE DRAWINGS

The invention will be better understood from the following description of a non-limiting embodiment which is given by way of illustration and is made with reference to the following drawings in which.

DETAILED DESCRIPTION OF THE PREFERRED EMBODIMENTS

Figure 1:
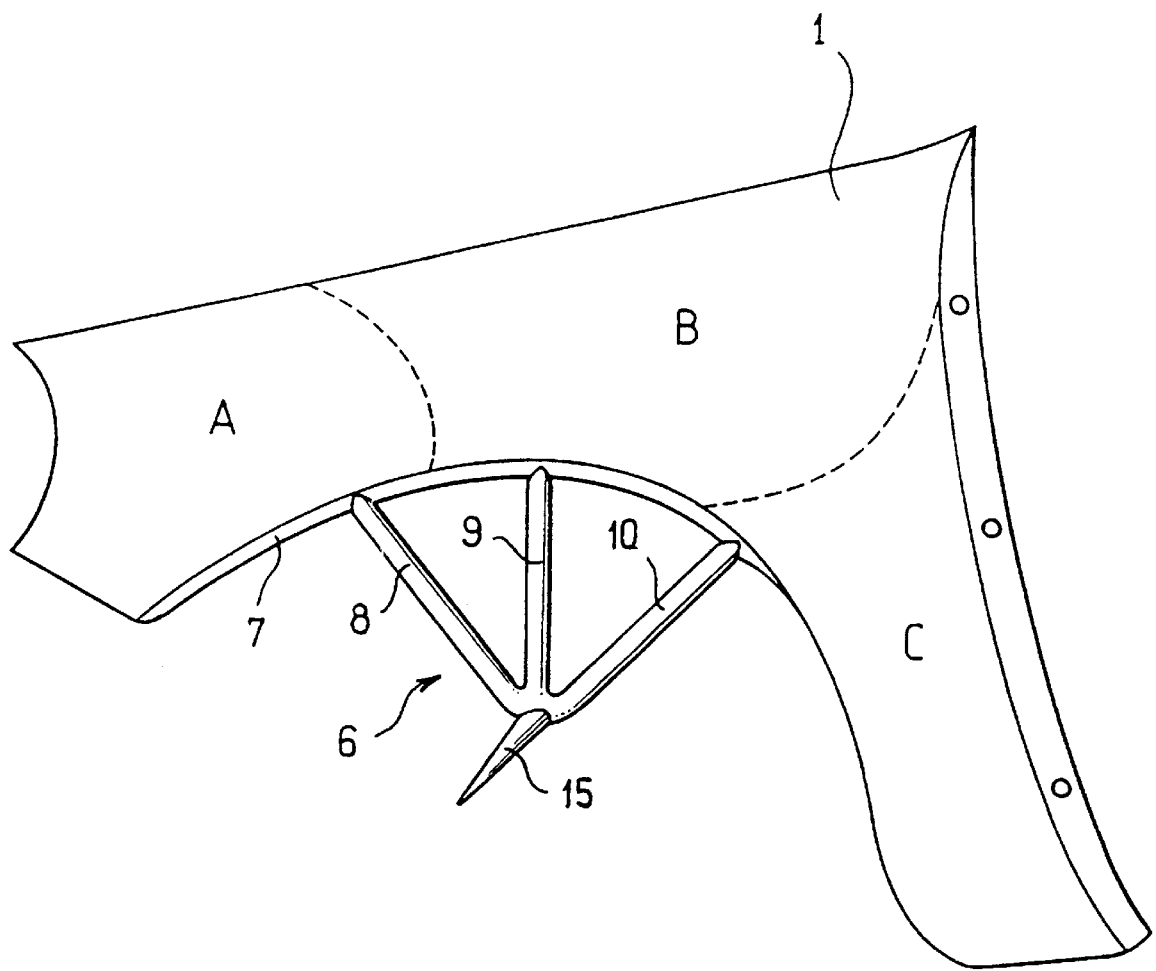
FIG. 1 is a diagram of the principle of injecting plastics material into the mold.

The body part 1 shown in FIG. 1 is a left front fender of an automotive vehicle.

This fender is produced using the apparatus 2 shown in FIGS. 2 to 5.

This apparatus 2 comprises a two-part mold 3, with a stationary part 3a and a movable part 3b, and an ejector plate 4 which is also movable using two large hydraulic actuators 5.

Figure 2:
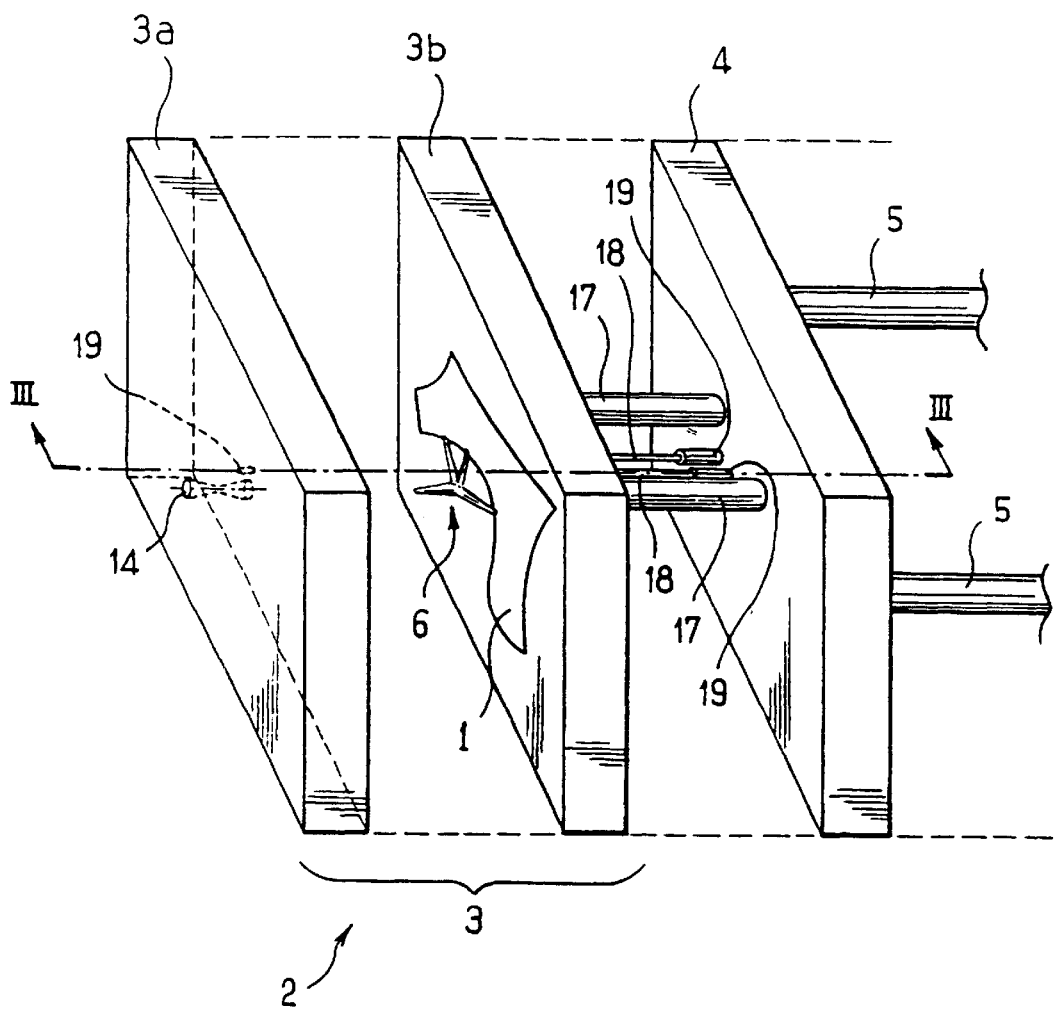
FIG. 2 is a perspective view of an open mold.
Figure 3:
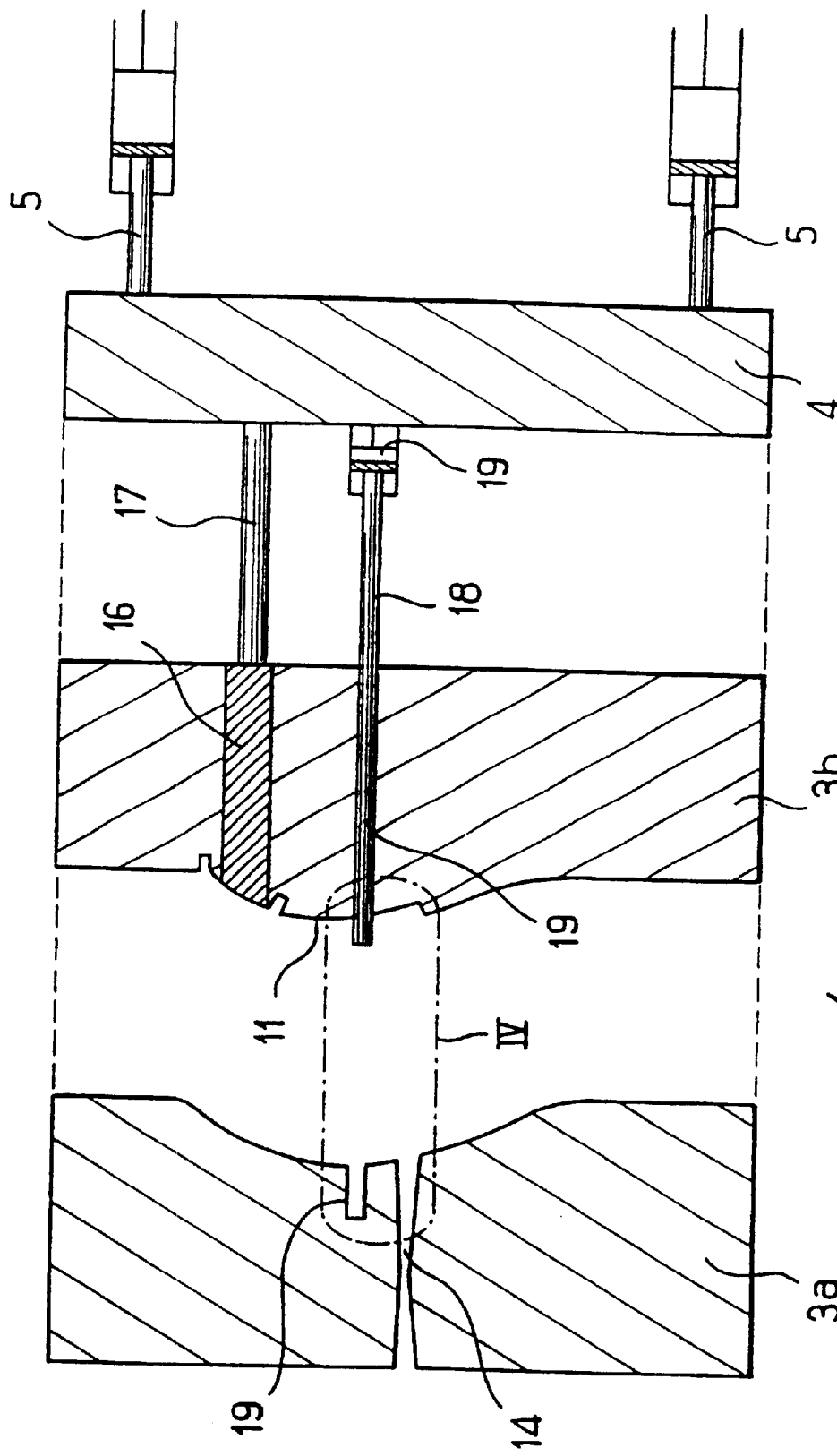
FIG. 3 is a section on III—III in FIG. 2.

In FIGS. 1 and 2, fender 1 is shown in its condition just after molding; for this reason, an injection sprue tree 6 is attached to the inwardly-directed rim 7 which defined the wheel arch.

This injection sprue tree 6 is constituted by the plastics material present in the cold runners of the mold at the end of injection, as is explained in more detail below.

In practice, this sprue tree 6 spontaneously detaches itself from fender 1 on ejection from mold 3 since the cross section of the three sprues 8, 9, 10 of the tree, which are connected to the fender, is reduced at the end which is attached to rim 7 of the fender.

Each of these three sprues 8, 9, 10 corresponds to one cold runner 13, 11, 12 (all three are visible in FIG. 5) hereinafter defined as a secondary runner, the three secondary runners being collectively fed by a main runner 14, perpendicular to the preceding runners, and connected to an injection screw (not shown) which feeds the molten plastics material under pressure.

It should be noted that the secondary runners 11, 12, 13 are defined in the injection mold, which includes no heating means and thus the secondary runners can be classified as cold runners.

The plastics material present in main runner 14 at the moment the part cools forms a fourth sprue 15 perpendicular to sprues 8, 9, 10.

The plastics material used to produce the bodywork fender described here is the product from GENERAL ELECTRIC PLASTICS B.V., sold under the trade name NORYL GTX.

This product is injected at a temperature of 310° C.

To fill the mold, the three secondary runners 11, 12, 13 collectively fed by main runner 14 are shut off, then the secondary runner 13 which is closest to the front end of the fender is opened to fill a first region of the mold corresponding to portion A of the fender in FIG. 1. This first secondary runner 13 is then shut off and the second secondary runner 11 located substantially in the middle of the fender is opened to fill a second region of the mold corresponding to portion B of the fender and contiguous with the first region, then this second secondary runner 11 is shut off and the third secondary runner 12 is opened to fill a third region of the mold, which is contiguous with the second region and corresponds to portion C of the fender located opposite its front portion A.

The three secondary runners are then opened to allow the injected plastics material to compact and to maintain the pressure as the part cools.

By filling the whole volume of the mold in stages from one end of the part, parts are obtained without any visible surface defects, in particular no defects resulting from a difference in viscosity in the plastics material injected.

The means used in the embodiment described to shut off the secondary runners are explained below.

The cavity for the fender is defined between stationary section 3a and movable section 3b of the mold, which sections are arranged in such a manner that, after the plastics material has been injected and the part has cooled, when the mold is opened by moving the movable section away from the stationary section (the ejector plate being displaced integrally with the movable section), fender 1 and the ejection sprue tree 6 remain secured to the movable section 3b of the mold.

Figure 5:
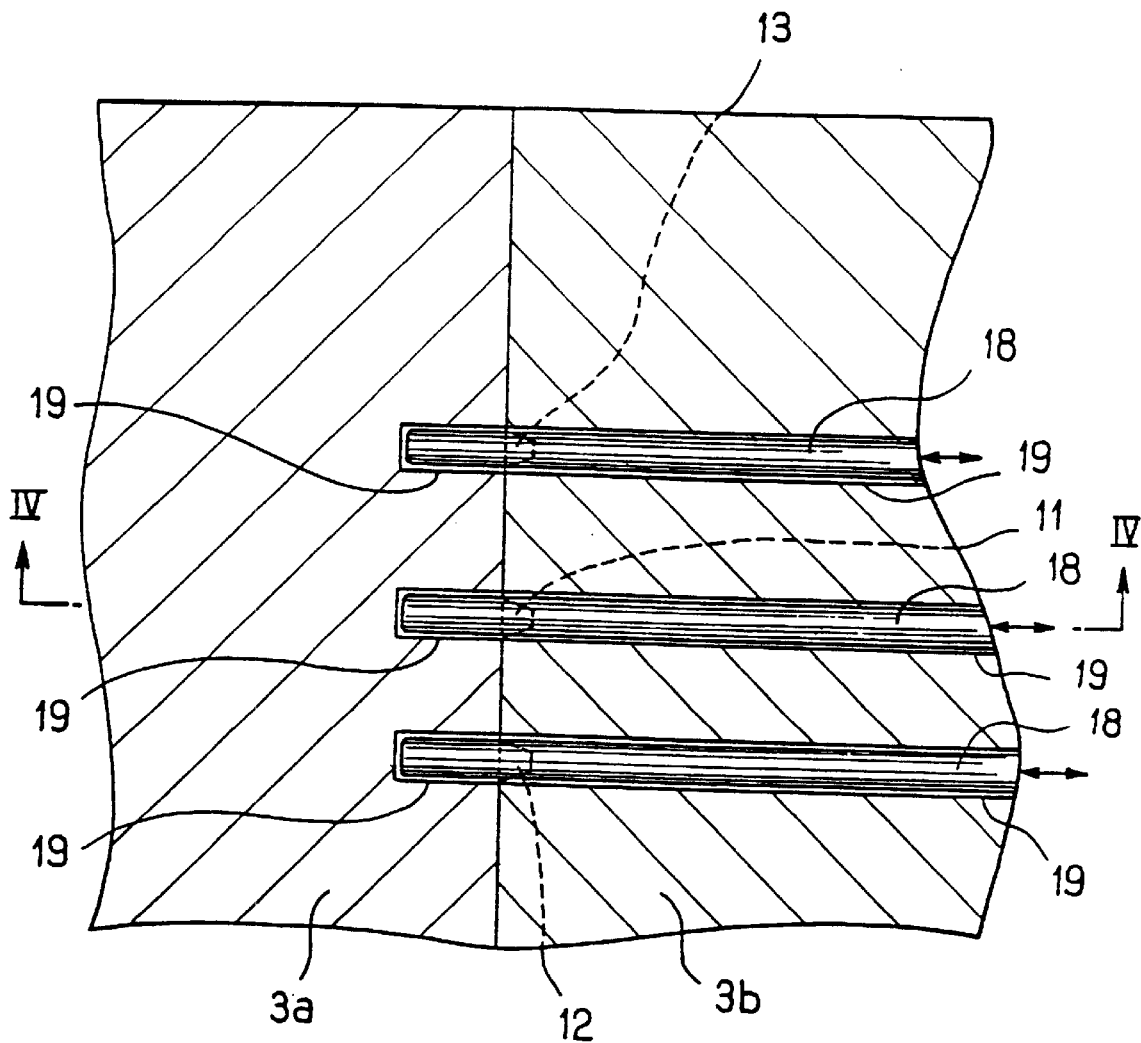
FIG. 5 is a section on V—V in FIG. 4.

As can be seen in FIG. 5, the trapezoidal cross section of the secondary runners 11, 12, 13 lies fully within the thickness of the wall of the movable section of the mold, with the fixed section 3a of the mold forming the large base of the trapezium.

In contrast, the main runner 14, which collectively feeds the three secondary runners 11, 12, 13, passes through the fixed section 3a of the mold and opens out to the side of the movable section at the point of intersection of the three secondary runners.

Once the mold is open, the plastics material part must be ejected from the movable section of the mold, this being carried out by ejectors mounted on ejector plate 4.

The ejectors for the fender proper are constituted by movable blocks 16 (FIG. 3) cut out from the thickness of movable section 3b and displaceable by means of rods 17 with the ejector plate 4 in the direction of the fixed section of the mold, by means of two large hydraulic rams 5.

To eject the plastics material sprue tree, three rods 18 are mounted on ejector plate 4, each of these rods 18 traversing the movable section 3b of the mold and opening into a secondary runner 11, 12, 13.

A small individual hydraulic actuator 19 is mounted at the base of each of the rods to enable each rod to be displaced individually, independently of the other rods, with respect to the ejector plate.

As can be seen in FIG. 5, each rod 18 is housed in a bore 19 traversing movable section 3b of the mold and extending into the fixed section 3a of the mold to a depth of about 2 centimeters (cm).

Figure 4:
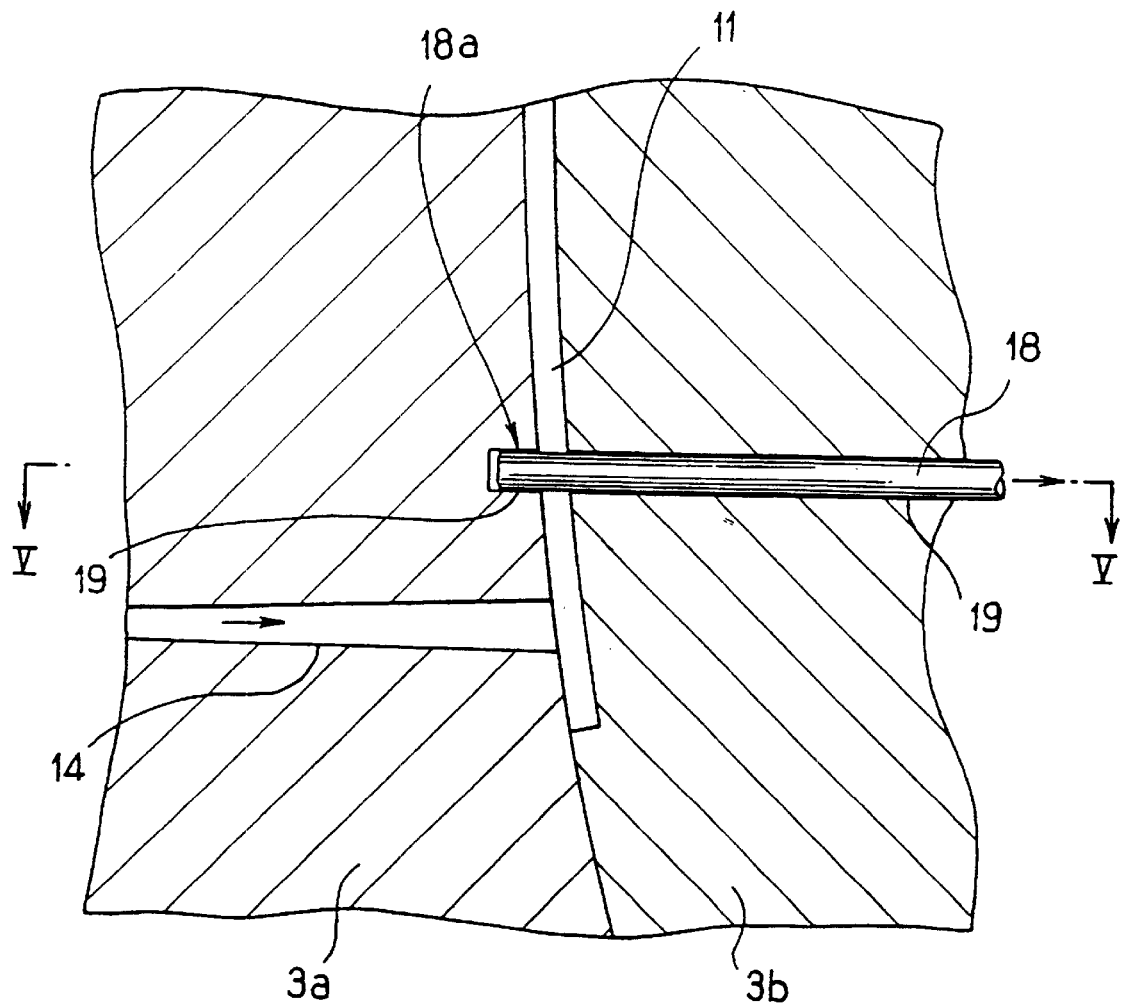
FIG. 4 is a larger scale view of portion IV of FIG. 3 after the mold has been closed.

Thus when the mold is closed, as shown in FIGS. 4 and 5, each rod 18 can take up a closed position in which it occupies the whole of bore 19 by penetrating into stationary section 3a of the mold and shutting off the corresponding secondary runner 11, and an open position in which its front end 18a is retracted from secondary runner 11 and leaves its flow section open.

FIG. 5 shows that the longitudinal section of each rod 18 is greater than the cross section of each secondary runner 11, 12, 13 such that when rod 18 extends across the secondary runner, the secondary runner is completely shut off.

It will be understood that, depending on the position of the ejector rods 18 in the mold, the flow section of each secondary runner is either open or shut off.

As a result, each rod 18 can fulfill the function of a shut-off for the corresponding secondary runner in addition to acting as an ejector.

Thus on injecting plastics material to produce the fender of FIG. 1, the three rods 18 are initially placed in the closed position.

Rod 18 corresponding to secondary runner 13, which feeds the front end of the fender, is then placed in the open position for a period of 0.7 seconds, then placed in its closed position again, after which rod 18 corresponding to secondary runner 11 which feeds the middle of the fender is placed in the open position for 0.7 seconds, then this too is closed again. Finally, the same operation is repeated using rod 18 of the third secondary runner 12.

The three rods are then placed in the open position to enable the plastics material to be compacted and to keep it under pressure during cooling.

In the open position, the rods can then act as ejectors, as described above.

On opening the mold, it only remains to eject the fender and sprue tree by displacing the ejector plate in the direction of the movable section of the mold by activating the large actuators 5 alone.

Clearly, the embodiment described above is not limiting in nature and any desired modification could by made thereto without departing from the spirit and scope of the invention.

What is claimed is:

1. A method of producing an automotive vehicle body part by injecting a plastics material sequentially into a cavity of a mold fed by cold runners, the method comprising filling firstly a first region at one end of the mold, then a second region adjacent to the first region, and repeating the operation comprising filling a new region adjacent to the preceding region each time, until a last region of the mold is reached at its end opposite from the first region, wherein each cold runner is shut off using a cold rod which is axially movable in a bore intersecting the cold runner, the longitudinal section of the rod overlaying the cross section of the runner.

2. A method according to claim 1, wherein the body part is a fender.

3. A method according to claim 1, wherein the body part is an external panel of a door.

4. A method according to claim 1, wherein the plastics material is of a type which must be injected at more than 290° C.

5. A method according to claim 1, wherein a mold is used that comprises a plurality of cold runners to direct the plastics material into the mold cavity, wherein said cold runners are shut off at the start of injection and wherein said cold runners are sequentially opened to inject plastics material into each successive region of the mold.

6. A method according to claim 5, wherein after each cold runner has been opened, it is individually shut off again before the next cold runner is opened, and then all the cold runners are opened to compact the plastics material and keep it under pressure as it cools.

7. A method according to claim 1, wherein the rod also acts as an ejector to unmold the sprue tree of plastics material from the cold runners on unmolding the plastics material part.

8. A method according to claim 1, wherein the plastics material is an alloy of a polyamide and polyphenylene-ether.

9. A method of injecting plastics material sequentially into a mold fed by cold runners, to produce an automotive vehicle body part, the method comprising:

providing the mold with bores intersecting the cold runners and with axially movable cold rods in said bores, the longitudinal section of each rod overlaying the cross section of the corresponding runner;

shutting off the cold runners using the rods at the start of injection; and opening the cold runners individually by displacing the rods in the bores.

10. A method according to claim 9, further comprising individually shutting off each cold runner then opening all of them to terminate injection by compacting and keeping the plastics material under pressure.

11. An injection mold for carrying out a method of injecting plastics material sequentially into a mold fed by cold runners, to produce an automotive vehicle body part, the method including providing the mold with bores intersecting the cold runners and with axially movable cold rods in said bores, the longitudinal section of each rod overlaying the cross section of the corresponding runners, shutting off the cold runners using the rods at the start of injection, and opening the cold runners individually by displacing the rods in the bores, the mold comprising: a rod, as a shut-off for a cold runner, said rod having a longitudinal section which overlays the cross section of the cold runner, the rod being axially movable in a bore intersecting the cold runner between a shut off position in which the rod traverses the cold runner and an open position in which the rod is retracted from the cold runner and leaves the cross section of the cold runner open.

12. A mold according to claim 11, wherein the rod also acts as an ejector for unmolding the plastics material sprue tree originating from the cold runners on unmolding the plastics material part.

13. A mold according to claim 12, wherein the rod is mounted on an independent actuator which allows it to be displaced in the bore to shut off the cold runner while the mold is closed.

* * * * *